United States Patent
Tian et al.

(10) Patent No.: US 9,742,575 B2
(45) Date of Patent: *Aug. 22, 2017

(54) EXPLICIT LIST ENCODING OF SPARSE MULTICAST GROUP MEMBERSHIP INFORMATION WITH BIT INDEX EXPLICIT REPLICATION (BIER)

(71) Applicant: Telefonaktiebolaget L M Ericsson (publ), Stockholm (SE)

(72) Inventors: Albert Jining Tian, Cupertino, CA (US); Ramanathan Lakshmikanthan, Santa Clara, CA (US); Antoni Przygienda, Sunnyvale, CA (US); Evgeny Tantsura, Palo Alto, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 313 days.

This patent is subject to a terminal disclaimer.

(21) Appl. No.: 14/596,114

(22) Filed: Jan. 13, 2015

(65) Prior Publication Data
US 2016/0127139 A1   May 5, 2016

Related U.S. Application Data

(60) Provisional application No. 62/075,128, filed on Nov. 4, 2014.

(51) Int. Cl.
*H04L 12/18* (2006.01)
*H04L 12/741* (2013.01)
(Continued)

(52) U.S. Cl.
CPC ............ *H04L 12/185* (2013.01); *H04L 45/16* (2013.01)

(58) Field of Classification Search
CPC .............................. H04L 12/185; H04L 45/16
See application file for complete search history.

(56) References Cited

U.S. PATENT DOCUMENTS 9,319,312 B2    4/2016  Filsfils et al.
9,432,205 B2 *  8/2016  Tian .................... H04L 12/1886
(Continued)

FOREIGN PATENT DOCUMENTS

WO   WO2016/071844 A1 *  5/2016  ........... H04L 12/185

OTHER PUBLICATIONS

Boivie, Rick , et al., "Small Group Multicast", Internet Draft; draft-boivie-sgm-02.txt, Feb. 2001; 17 pages.
(Continued)

*Primary Examiner* — Melvin Marcelo
(74) *Attorney, Agent, or Firm* — Nicholson De Vos Webster & Elliott LLP

(57) ABSTRACT

A network device executes a method to forward a packet that is encoded using an explicit list encoding of sparse multicast group membership information with Bit Index Explicit Replication. The method includes receiving a packet that includes a bitstring having a list of Bit Forwarding Router IDs (BFR-ids). The method further includes selecting a BFR-id identifying a destination Bit Forwarding Router (BFR) from the list for processing, looking up a forwarding bitmask for the destination BFR and a next-hop to reach the destination BFR in a bit index forwarding table, creating a copy of the packet, clearing the selected BFR-id from the packet, clearing BFR-ids from the packet and the copy of the packet based on the forwarding bitmask, and forwarding the copy of the packet to the next-hop neighbor.

18 Claims, 6 Drawing Sheets

(51) Int. Cl.
H04L 12/773 (2013.01)
H04L 12/761 (2013.01)

(56) References Cited

U.S. PATENT DOCUMENTS

| | | | |
|---|---|---|---|
| 9,438,432 B2* | 9/2016 | Shepherd | H04L 45/74 |
| 2007/0189291 A1 | 8/2007 | Tian | |
| 2015/0309746 A1 | 10/2015 | Fornander et al. | |
| 2016/0087890 A1* | 3/2016 | Przygienda | H04L 45/16 370/255 |
| 2016/0110120 A1 | 4/2016 | Pattabiraman et al. | |
| 2016/0119159 A1 | 4/2016 | Zhao et al. | |

OTHER PUBLICATIONS

Wijnands, IJ, et al., "Encapsulation for Bit Index Explicit Replication in MPLS Networks", draft-wijnands-mpls-bier-encapsulation-00; Sep. 22, 2014; 10 pages.
Wijnands, IJ, et al., "Multicast using Bit Index Explicit Replication", draft-wijnands-bier-architecture-00; Sep. 22, 2014; 24 pages.
Ali, Z., et al., "Node-IDS Based Resource Reservation Protocol (RSVP) Hello: A Clarification Statement", Network Working Group; RFC 4558; Jun. 2006; 7 pages.
Andersson, L., et al., "LDP Specification", Network Working Group; RFC 5036; Oct. 2007; 135 pages.
Awduche, D., et al., "RSVP-TE: Extensions to RSVP for LSP Tunnels", Network Working Group; RFC 3209; Dec. 2001; 61 pages.
Babiarz, J., et al., "Configuration Guidelines for DiffServ Service Classes", Network Working Group; RFC 4594; Aug. 2006; 57 pages.
Baker, F., et al., "A Differentiated Services Code Point (DSCP) for Capacity-Admitted Traffic", Internet Engineering Task Force (IETF); RFC 5865; May 2010; 14 pages.
Baker, F., et al., "Management Information Base for the Differentiated Services Architecture", Network Working Group, Request for Comment: 3289, May 2002, 116 pages.
Berger, L., "Generalized Multi-Protocol Label Switching (GMPLS) Signaling Resource ReserVation Protocol-Traffic Engineering (RSVP-TE)", Network Working Group; RFC 3473; Jan. 2003; 42 pages.
Bernet, Y., et al., "An Informal Management Model for Diffserv Routers", Network Working Group; RFC 3290; May 2002; 56 pages.
Black, D., "Differentiated Services and Tunnels", Network Working Group; RFC 2983; Oct. 2000; 14 pages.
Black, D., et al., "Per Hop Behavior Identification Codes", Network Working Group; RFC 3140; Jun. 2001; 8 pages.
Blake, S., et al., "An Architecture for Differentiated Services", Network Working Group; RFC 2475; Dec. 1998; 36 pages.
Borman, D., et al., "IPv6 Jumbograms", Network Working Group, Request for Comments: 2675, Aug. 1999, 9 pages.
Braden, R., et al., "Resource ReSerVation Protocol (RSVP)", Network Working Group; RFC 2205; Sep. 1997; 112 pages.
Chan, K., et al., "Differentiated Services Quality of Service Policy Information Base", Network Working Group; RFC 3317; Mar. 2003; 96 pages.
Charny, A., et al., "Supplemental Information for the New Definition of the EF PHB (Expedited Forwarding Per-Hop Behavior)", Network Working Group; RFC 3247; Mar. 2002; 24 pages.
Coltun, R., et al., "OSPF for IPv6", Network Working Group, Request for Comment: 5340, Jul. 2008, 94 pages.
Davie, B., et al., "An Expedited Forwarding PHB (Per-Hop Behavior)," Mar. 2002, 16 pages, Network Working Group, Request for Comments: 3246, The Internet Society.
Deering, S., et al., "Internet Protocol, Version 6 (IPv6) Specification", Network Working Group, Request for Comments: 2460, Dec. 1998, 39 pages.

Eggert, L., et al., "Unicast UDP Usage guidelines for Application Designers", Network Working Group; RFC 5405; Nov. 2008; 27 pages.
Fenner, B., et al., "Management Information Base for the User Datagram Protocol (UDP)", Network Working Group; RFC 4113; Jun. 2005; 19 pages.
Grossman, D., "New Terminology and Clarifications for Diffserv", Network Working Group; RFC 3260; Apr. 2002; 10 pages.
Heinanen, J., et al., "Assured Forwarding PHB Group", Network Working Group; RFC 2597; Jun. 1999; 11 pages.
Hendrick, C., "Routing Information Protocol", Network Working Group, Request for Comment: 1058, Jun. 1988, 33 pages.
Housley, R., et al., "Using Advanced Encryption Standard (AES) CCM Mode with IPsec Encapsulating Security Payload (ESP)", Network Working Group; RFC 4309; Dec. 2005; 13 pages.
Information Sciences Institute, University of Southern California, et al., "Transmission control protocol darpa internet program protocol specification", Sep. 1981, RFC: 793, 9 pages.
Kent, S., et al., "Security Architecture for the Internet Protocol", Network Working Group; RFC 4301; Dec. 2005; 101 pages.
Kompella, K., et al., "Procedures for Modifying the Resource reSerVation Protocol (RSVP)", Network Working Group; RFC 3936; Oct. 2004; 7 pages.
Malkin, G., et al., "RIP Version 2", Network Working Group; RFC 2453; Nov. 1998; 39 pages.
Malkin, G., et al., "RIPng for IPv6", Network Working Group; RFC 2080; Jan. 1997; 19 pages.
Moy, J., "OSPF Version 2", Network Working Group, Request for Comments: 2328, Apr. 1998, 244 pages.
Nichols, K., et al., "Definition of Differentiated Services Per Domain Behaviors and Rules for their Specification", Network Working Group; RFC 3086; Apr. 2001; 24 pages.
Nichols, K., et al., "Definition of the Differentiated Services Field (DS Field) in the IPv4 and IPv6 Headers", Network Working Group; RFC 2474; Dec. 1998; 20 pages.
Oran, D., "OSI ISIS Intradomain Routing Protocol", Network Working Group, Request for Comments: 1142, (Feb. 1990), 157 pages.
Polk, J., et al., "A Resource Reservation Protocol (RSVP) Extension for the Reduction of Bandwidth of a Reservation Flow", Network Working Group; RFC 4495; May 2006; 21 pages.
Postel, J., "User Datagram Protocol", Aug. 28, 1980, 3 pages, RFC 768.
Rekhter, Y., et al., "A Border Gateway Protocol 4 (BGP-4)", Network Working Group; RFC 4271; Jan. 2006; 104 pages.
Rosen, E., et al., "BGP/MPLS IP Virtual Private Networks (VPNs)", Network Working Group, Request for Comment: 4364, Feb. 2006, 47 pages.
Shenker, S., et al., "Specification of Guaranteed Quality of Services", Network Working Group; RFC 2212; Sep. 1997; 20 pages.
Socolofsky, T., et al., "A TCP/IP Tutorial", Network Working Group; RFC 1180; Jan. 1991; 28 pages.
Wroclawski, J., "Specification of the Controlled-Load Network Element Service", Network Working Group; RFC 2211; Sep. 1997; 19 pages.
Wroclawski, J., "The Use of RSVP with IETF Integrated Services", Network Working Group; RFC 2210; Sep. 1997; 33 pages.
Bier, et al. "[Bier] Blocked Based Encoding and List Based Encoding for BIER," including "draft-tian-bier-blocks-00" and "draft-tian-bier-list-00," The Internet Engineering Task Force (IETF), Nov. 6, 2014, 14 pages.
RFC 2991: Thaler., et al., "Multipath Issues in Unicast and Multicast Next-Hop Selection," 2000, 9 pages, Network Norking Group, The Internet Society, Request for Comments: 2991.
RFC 2992: Hopps C., "Analysis of an Equal-Cost Multi-Path Algorithm," 2000, 8 pages, Network Working Group, The Internet Society, Request for Comments: 2992.
Wijnands, et al., "Encapsulation for Bit Index Explicit Replication in MPLS Networks, draft-wijnands-mpls-bier-encapsulation-01 ," Internet Engineering Task Force (IETF), Internet-Draft, Oct. 16, 2014, 11 pages.

(56) References Cited

OTHER PUBLICATIONS

Wijnands, et al., "Multicast using Bit Index Explicit Replication, draft-wijnands-bier-architecture-01," Internet Engineering Task Force (IETF), Internet-Draft, Oct. 16, 2014, 24 pages.

* cited by examiner

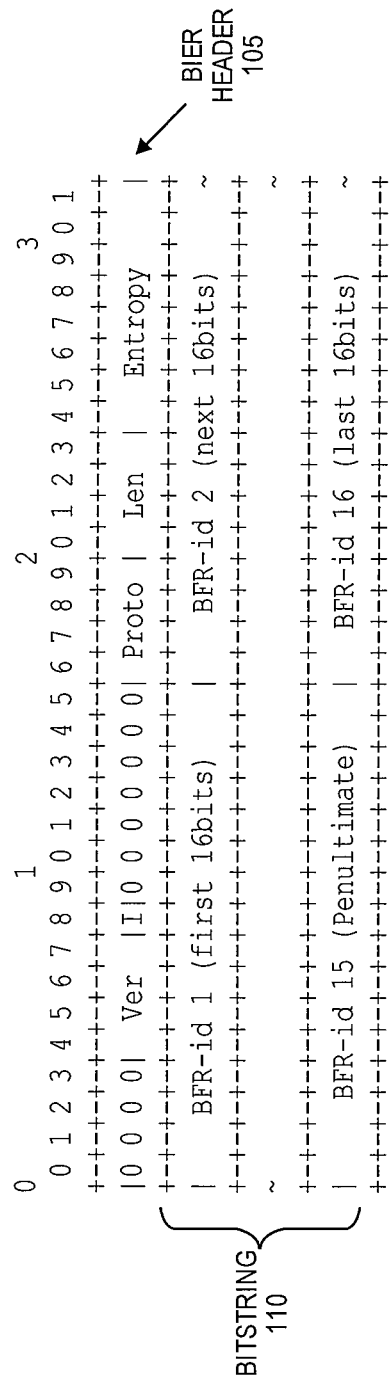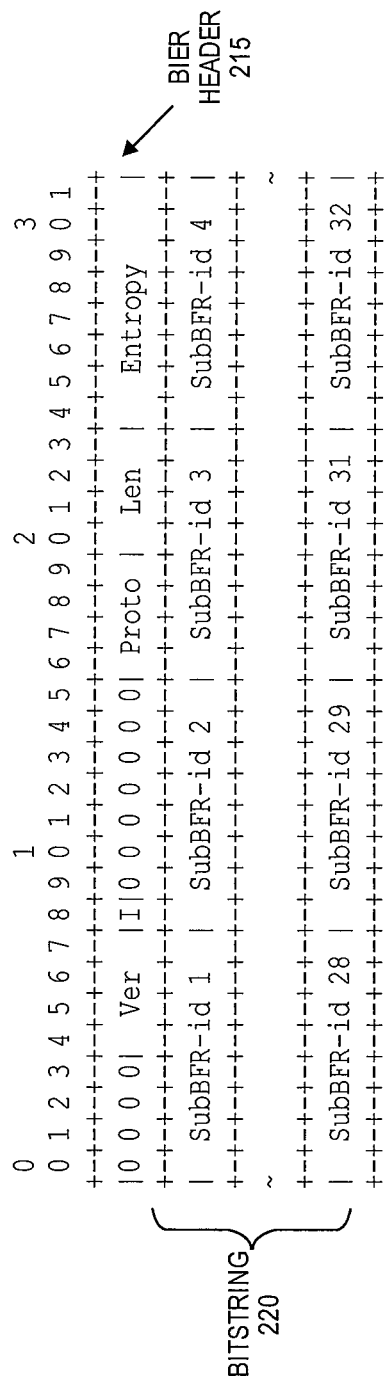

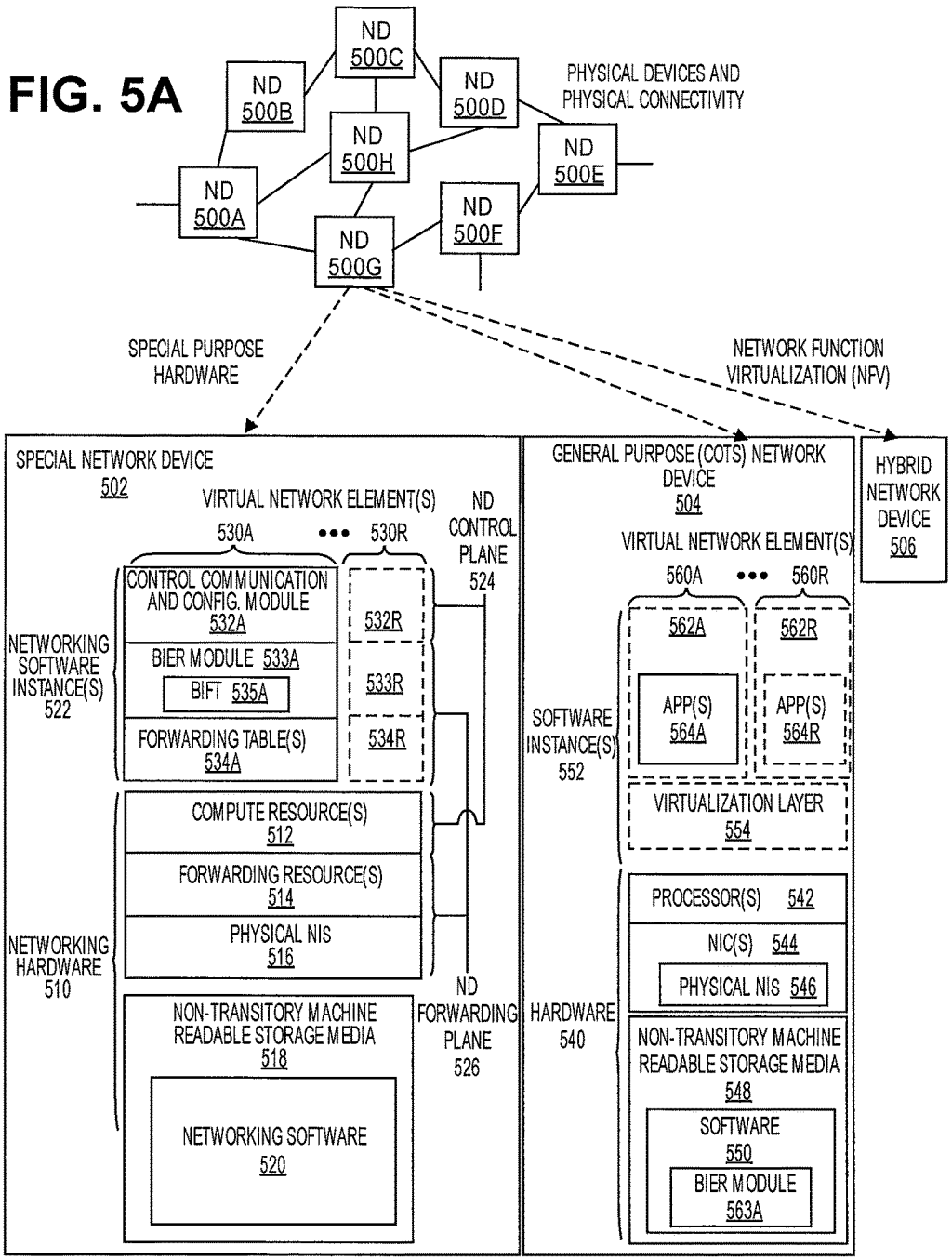
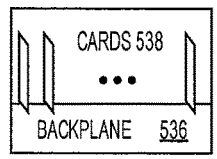

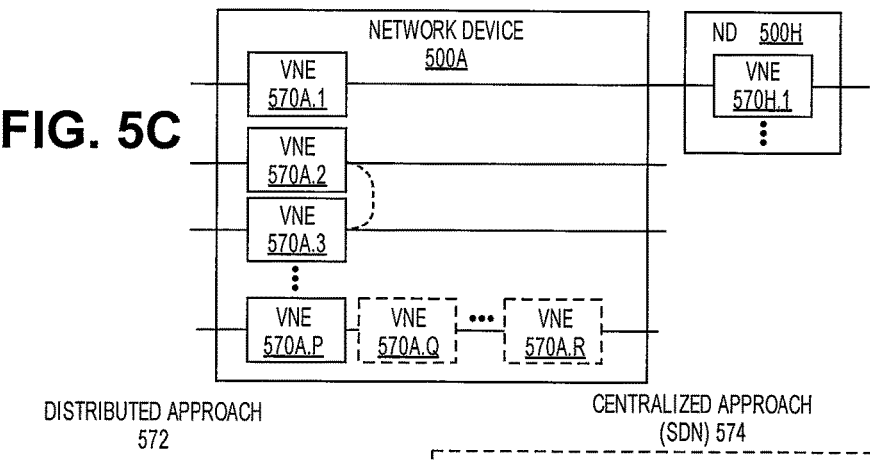
FIG. 5C
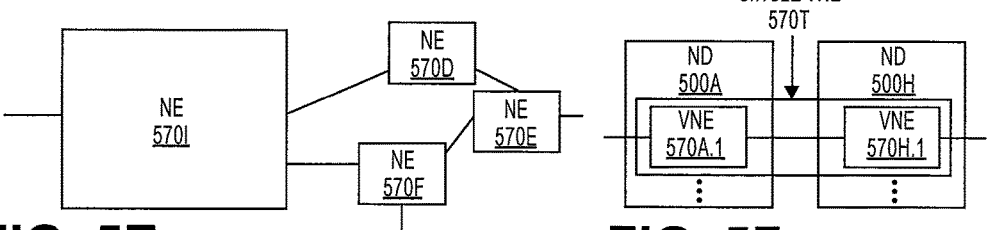
FIG. 5D
FIG. 5E
FIG. 5F

EXPLICIT LIST ENCODING OF SPARSE MULTICAST GROUP MEMBERSHIP INFORMATION WITH BIT INDEX EXPLICIT REPLICATION (BIER)

CROSS-REFERENCE TO RELATED APPLICATIONS

The present application claims the benefit of U.S. Provisional Patent Application No. 62/075,128 filed on Nov. 4, 2014, which is hereby incorporated by reference. Cross-reference is made to U.S. application Ser. No. 14/596,110, entitled "Explicit Block Encoding of Multicast Group Membership Information with Bit Index Explicit Replication (BIER)" filed Jan. 13, 2015 (now U.S. Pat. No. 9,432,205 issued Aug. 30, 2016) and commonly owned. The cross-referenced application is hereby incorporated by reference.

FIELD

Embodiments of the invention relate to the field of multicast routing and forwarding. More specifically, the embodiments relate to an explicit list encoding of multicast membership information with Bit Index Explicit Replication (BIER).

BACKGROUND

Traditional multicast distribution of Internet Protocol (IP) packets are supported via IP multicast routing and forwarding, which use protocols such as Protocol Independent Multicast (PIM) or Multicast Label Distribution Protocol (LDP) to create multicast replication states on the nodes along the multicast distribution tree in the network. Packets flowing through the network will be replicated to the proper set of neighbors following the replication states on each router.

The multicast forwarding states are hard to aggregate since each application may have a different set of participants, therefore the multicast distribution trees for the applications can all be different. This can cause an explosion of multicast states in the core of the network where all the multicast traffic are passing through.

One prior art technique of reducing the amount of multicast state stored at routers is to encode the multicast membership information directly in the packet header. Bit Index Explicit Replication (BIER) is an example of such a technique.

BIER forwards multicast packets without requiring any intermediate nodes to maintain per-flow state. When a multicast data packet enters a domain, an ingress router determines the set of egress routers to which the packet needs to be sent. The ingress router then encapsulates the packet in a BIER header, which contains a bitstring in which each bit represents exactly one egress router in the domain. Bit Index Explicit Replication (BIER) is defined in IETF Multicast using Bit Index Explicit Replication (published Oct. 16, 2014 as draft-wijnands-bier-architecture-01).

When the multicast group is densely populated (many members are receiving packets for the group), the BIER encoding is efficient. However, in reality, most of the multicast groups are relatively sparse, when compared to the total number of routers in a network. Usually, only a small subset of the routers in the network are participating in any given multicast group (with the rare exception of few popular groups that draw large audiences). In these cases, the bitstring encoding used in BIER would end up having very few one (1) bits and many zero bits, which results in inefficient encoding.

In the case when group membership spans across multiple regions, ingress replication will be used, creating even more inefficiencies due to unnecessary packet replication at ingress.

SUMMARY

A method is implemented by a network device to forward a packet that is encoded using an explicit list encoding of sparse multicast group membership information with Bit Index Explicit Replication (BIER). The method includes receiving a packet, where the packet includes a bitstring that includes a list of one or more Bit Forwarding Router IDs (BFR-ids). The method further includes selecting an unprocessed BFR-id from the list of BFR-ids for processing, where the selected BFR-id identifies a destination Bit Forwarding Router (BFR), looking up a forwarding bitmask for the destination BFR and a next-hop neighbor to reach the destination BFR in a bit index forwarding table (BIFT) based on the selected BFR-id, creating a copy of the packet, clearing the selected BFR-id from the bitstring of the packet, checking, for each unprocessed BFR-id, whether a bit corresponding to that unprocessed BFR-id is set in the forwarding bitmask, clearing, from the bitstring of the packet, each unprocessed BFR-id for which a bit corresponding to that unprocessed BFR-id is set in the forwarding bitmask, clearing, from a bitstring of the copy of the packet, each unprocessed BFR-id for which a bit corresponding to that unprocessed BFR-id is not set in the forwarding bitmask, and forwarding the copy of the packet to the next-hop neighbor.

A network device is configured to forward a packet that is encoded using an explicit list encoding of sparse multicast group membership information with Bit Index Explicit Replication (BIER). The network device includes a non-transitory machine readable medium to store a BIER module. The network device also includes a network processor that is communicatively coupled to the non-transitory machine readable medium. The network processor is configured to execute the BIER module. The BIER module is configured to receive a packet, where the packet includes a bitstring that includes a list of one or more Bit Forwarding Router IDs (BFR-ids). The BIER module is further configured to select an unprocessed BFR-id from the list of BFR-ids for processing, where the selected BFR-id identifies a destination Bit Forwarding Router (BFR), look up a forwarding bitmask for the destination BFR and a next-hop neighbor to reach the destination BFR in a bit index forwarding table (BIFT) based on the selected BFR-id, create a copy of the packet, clear the selected BFR-id from the bitstring of the packet, check, for each unprocessed BFR-id, whether a bit corresponding to that unprocessed BFR-id is set in the forwarding bitmask, clear, from the bitstring of the packet, each unprocessed BFR-id for which a bit corresponding to that unprocessed BFR-id is set in the forwarding bitmask, clear, from a bitstring of the copy of the packet, each unprocessed BFR-id for which a bit corresponding to that unprocessed BFR-id is not set in the forwarding bitmask, and forward the copy of the packet to the next-hop neighbor.

A non-transitory machine readable storage medium has stored therein instructions to be executed by a network device to forward a packet that is encoded using an explicit list encoding of sparse multicast group membership information with Bit Index Explicit Replication (BIER). The instructions cause the network device to perform a set of operations including, receiving a packet, where the packet includes a bitstring that includes a list of one or more Bit Forwarding Router IDs (BFR-ids). The execution further causes the network device to perform a set of operations including selecting an unprocessed BFR-id from the list of BFR-ids for processing, where the selected BFR-id identifies a destination Bit Forwarding Router (BFR), looking up a forwarding bitmask for the destination BFR and a next-hop neighbor to reach the destination BFR in a bit index forwarding table (BIFT) based on the selected BFR-id, creating a copy of the packet, clearing the selected BFR-id from the bitstring of the packet, checking, for each unprocessed BFR-id, whether a bit corresponding to that unprocessed BFR-id is set in the forwarding bitmask, clearing, from the bitstring of the packet, each unprocessed BFR-id for which a bit corresponding to that unprocessed BFR-id is set in the forwarding bitmask, clearing, from a bitstring of the copy of the packet, each unprocessed BFR-id for which a bit corresponding to that unprocessed BFR-id is not set in the forwarding bitmask, and forwarding the copy of the packet to the next-hop neighbor.

A computing device implements a plurality of virtual machines for implementing network function virtualization (NFV), where a virtual machine from the plurality of virtual machines is configured to forward a packet that is encoded using an explicit list encoding of sparse multicast group membership information with Bit Index Explicit Replication (BIER). The computing device includes a storage medium to store a BIER module and a processor communicatively coupled to the storage medium. The processor is configured to execute the virtual machine, where the virtual machine is configured to implement the BIER module. The BIER module is configured to receive a packet, where the packet includes a bitstring that includes a list of one or more Bit Forwarding Router IDs (BFR-ids). The BIER module is further configured to select an unprocessed BFR-id from the list of BFR-ids for processing, where the selected BFR-id identifies a destination Bit Forwarding Router (BFR), look up a forwarding bitmask for the destination BFR and a next-hop neighbor to reach the destination BFR in a bit index forwarding table (BIFT) based on the selected BFR-id, create a copy of the packet, clear the selected BFR-id from the bitstring of the packet, check, for each unprocessed BFR-id, whether a bit corresponding to that unprocessed BFR-id is set in the forwarding bitmask, clear, from the bitstring of the packet, each unprocessed BFR-id for which a bit corresponding to that unprocessed BFR-id is set in the forwarding bitmask, clear, from a bitstring of the copy of the packet, each unprocessed BFR-id for which a bit corresponding to that unprocessed BFR-id is not set in the forwarding bitmask, and forward the copy of the packet to the next-hop neighbor.

BRIEF DESCRIPTION OF THE DRAWINGS

The invention may best be understood by referring to the following description and accompanying drawings that are used to illustrate embodiments of the invention. In the drawings:

FIG. 1 is a diagram showing one embodiment of a packet layout that efficiently encodes multicast membership information with BIER by directly encoding a full BFR-id list in the bitstring.

FIG. 2 is a diagram showing another embodiment of a packet layout that efficiently encodes multicast membership information with BIER by directly encoding a Sub BFR-id list in the bitstring.

FIG. 5A illustrates connectivity between network devices (NDs) within an exemplary network, as well as three exemplary implementations of the NDs, according to some embodiments of the invention.

FIG. 5B illustrates an exemplary way to implement a special-purpose network device according to some embodiments of the invention.

FIG. 5C illustrates various exemplary ways in which virtual network elements (VNEs) may be coupled according to some embodiments of the invention.

FIG. 5D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 5E illustrates the simple case of where each of the NDs implements a single NE, but a centralized control plane has abstracted multiple of the NEs in different NDs into (to represent) a single NE in one of the virtual network(s), according to some embodiments of the invention.

FIG. 5F illustrates a case where multiple VNEs are implemented on different NDs and are coupled to each other, and where a centralized control plane has abstracted these multiple VNEs such that they appear as a single VNE within one of the virtual networks, according to some embodiments of the invention.

DETAILED DESCRIPTION

Figure 3:
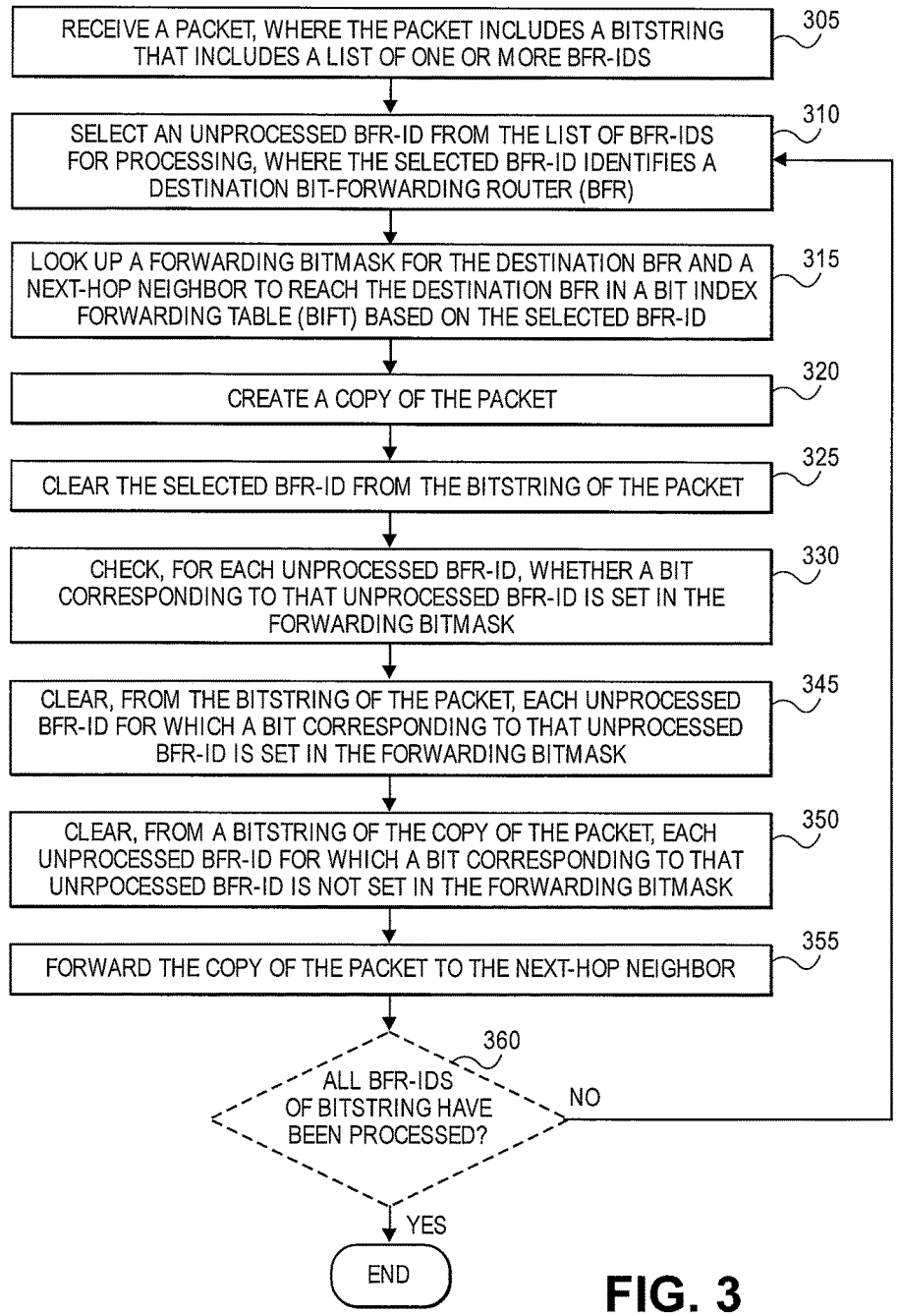
FIG. 3 is a flow diagram of one embodiment of a process for forwarding packets that utilize efficient BIER encoding.

The following description describes methods and apparatus for forwarding multicast packets using an efficient encoding of multicast membership information with Bit Index Explicit Replication (BIER). In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

BIER is an architecture for the forwarding of multicast data packets that encode multicast group membership information directly in the packet header (e.g., a BIER header). BIER allows for forwarding of multicast packets without requiring any intermediate nodes to maintain per-flow state. A network device or router that supports BIER is referred to herein as a Bit-Forwarding Router (BFR). A BIER domain is a connected set of BFRs, where each BFR has a BFR identifier (BFR-id) that is unique within the domain. When a multicast data packet enters a BIER domain, an ingress BFR ("Bit-Forwarding Ingress Router" or BFIR) determines the set of egress BFRs ("Bit-Forwarding Egress Router" or BFER) to which the packet needs to be sent. The BFIR then encapsulates the packet in a BIER header, which contains a bitstring, in which each bit represents a BFR-id of a BFER in the domain. Bits in the bitstring can be set (or "turned on") to forward the packet to a given set of BFERs.

The number of BFERs to which a given packet can be forwarded is limited only by the length of the bitstring ("BitStringLength") in the BIER header. Different deployments can use different BitStringLength. It is possible that some deployments will have more routers in a given BIER domain than there are bits in a bitstring. To accommodate this case, the BIER encapsulation includes both the bitstring and a Set Identifier (SI). The SI together with the bitstring determines the set of BFERs to which a given packet will be delivered. For example, if a BIER-encapsulated packet has an SI of n and a bitstring with bit position k set, then the packet must be delivered to the BFER whose BFR-id is n*BitStringLength+k.

When a BFIR determines that a multicast data packet needs to be forwarded to a particular set of destination BFERs, it partitions that set of egress routers into subsets, such that each subset contains destination egress routers that resolve to the same SI. These are called the SI-subsets for the packet. Each SI-subset is represented by a single bitstring. The ingress router creates a copy of the packet for each SI-subset and BIER-encapsulation is applied to each copy. Thus, the encapsulation specifies a single SI for each packet, and contains the bitstring that represents all BFR-ids in the corresponding SI-subset.

An overview of the BEIR architecture is described above to aid the understanding of the present invention. For clarity and ease of understanding, some details of the BIER architecture have been omitted. A more detailed description of the BIER architecture is described in draft-wijnands-bier-architecture-01, which is hereby incorporated by reference. An example of a BIER packet header encoding for Multiprotocol Label Switching (MPLS) networks is described in IETF draft Encapsulation for Bit Index Explicit Replication in MPLS Networks (published Oct. 16, 2014 as draft-wijnands-mpls-bier-encapsulation-01), which is hereby incorporated by reference.

When a multicast group is densely populated (many members are receiving packets for the group), the BIER encoding is efficient. However, in reality, most of the multicast groups are relatively sparse, when compared to the total number of routers in a network. Usually, only a small subset of the routers in the network are participating in any given multicast group (with the rare exception of few popular groups that draw large audiences). In these cases, the bitstring encoding used in BIER would end up having very few one (1) bits and many zero bits, which results in inefficient encoding.

Also, when a multicast group has members that span across multiple regions (multiple SI), packets are replicated at the BFIR for each region (SI). This creates more inefficiency because in a large network, groups will often have members across multiple regions, thus causing many unnecessary replications at ingress. In the worst case scenarios, which is not necessarily un-common, a group may have only one member in each of the regions. In other words, all group members have different SIs. In these cases, copies have to be delivered to each SI via ingress replications.

The embodiments of the invention described herein below overcome the disadvantages of the prior art by providing a more efficient encoding scheme that directly encodes a list of BFR-ids or SubBFR-ids in the bitstring. A process for forwarding such efficiently encoded packets is also described below. The embodiments are particularly advantageous when group membership is sparse and/or all the group members (or most of them) have different SIs.

Encoding

FIG. 1 is a diagram showing one embodiment of a packet layout that efficiently encodes multicast membership information with BIER by directly encoding a full BFR-id list in the bitstring.

A full BFR-id is composed of higher order S-bits of SI and lower order B-bits of SubBFR-id. The parameters S and B can be assigned different values depending on the configuration.

The encoding scheme used by the packet layout shown in FIG. 1 directly encodes a list of full BFR-ids in the bitstring 210. In this example of FIG. 1, we use a 256-bit bitstring 110 in each packet. The bitstring 110 starts after the BIER header 105. In the example shown in FIG. 1, a bitstring of length 256 bits accommodates 16 BFR-ids, each of which is 16-bits long. For the case that the SI range is [0 ... 15], each BFR-id has only lower 12 bits in use, thus 21 such shortened 12-bit BFR-ids can be encoded in a bitstring of length 256 bits. In one embodiment, more group members can be accommodated by using a longer bitstring. The maximum number of BFR-ids that can be encoded in a single packet is determined by the acceptable length of the bitstring and the size of each BFR-id.

The efficient encoding scheme described above with reference to FIG. 1 thus encodes group membership as an explicit list of BFR-ids in the packet header. This type of encoding scheme is best suited for the case when group memberships are sparsely populated and all members (or nearly all) have different SIs (from different regions). When the group members all (or nearly all) have different SIs, the prior art BIER architecture would require ingress replication to send duplicate packet for each SI. However, with this encoding scheme that encodes group membership as an explicit list of BFR-ids, group members having different SIs can be accommodated in the same packet, up to 16 of them in the example shown in FIG. 1. Also, the efficient encoding scheme can use less bits to encode group membership information, especially when group membership is sparse. For example, when the group size is less than 16, the encoding scheme of FIG. 1 provides better encoding efficiency (compared to traditional BIER) because the encoding may not use the full 256 bitstring.

FIG. 2 is a diagram showing another embodiment of a packet layout that efficiently encodes multicast membership information with BIER by directly encoding a Sub BFR-id list in the bitstring.

For the case when all members are in the same SI, an explicit list based encoding may also provide better encoding efficiency for sparse groups. In this example, we again use a 256-bit bitstring 220 in each packet. The bitstring 220 starts after the BIER header 215. Consider a case where each region can have up to 256 BFRs. In this case, 8-bits are needed to represent a SubBFR-id. In the example shown in FIG. 2, a bitstring of length 256 bits accommodates 32 SubBFR-ids, each of which is 8-bits long. In one embodiment, more group members can be accommodated by using a longer bitstring. The maximum number of SubBFR-ids that can be encoded in a single packet is determined by the acceptable length of the bitstring and the size of each SubBFR-id.

The efficient encoding scheme described above with reference to FIG. 2 thus encodes group membership as an explicit list of SubBFR-ids in the packet header. This type of encoding scheme is best suited for the case when group memberships are sparsely populated and all members have the same SI. The efficient encoding scheme can use less bits to encode group membership information, especially when group membership is sparse. For example, when the group size is less than 32, the encoding scheme of FIG. 2 provides better encoding efficiency (compared to traditional BIER) because the encoding may not use the full 256 bitstring.

Although the examples provided above in FIG. 1 and FIG. 2 use a 16-bit BFR-id and an 8-bit SubBFR-id, respectively, one having ordinary skill in the art will understand that the embodiments described herein can use other sizes of bitstring, BFR-id, and SubBFR-id based on the desired configuration.

Packet Forwarding

FIG. 3 is a flow diagram of one embodiment of a process for forwarding packets that utilize efficient BIER encoding. In one embodiment, the operations of the flow diagrams may be performed by various components of a network device/BFR such as the exemplary network device/BFR illustrated in FIG. 4 described in additional detail below. The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

In one embodiment, the process is initiated when a BFR receives a packet, where the packet includes a bitstring that includes a list of one or more BFR-ids (block 305). In one embodiment, the packet has a packet layout as described above with relation to FIG. 1 or FIG. 2 or similar packet layout.

The BFR selects an unprocessed BFR-id from the list of BFR-ids for processing, where the selected BFR-id identifies a destination bit-forwarding router (BFR) (block 310). In one embodiment, the BFR-ids are processed in order as arranged in the packet. In other embodiments, the blocks can be processed in any order including, in some cases, a parallel processing of the BFR-ids. For sake of clarity a process of serially processing the BFR-ids is described, which is provided by way of example and not limitation.

The BFR looks up a forwarding bitmask for the destination BFR and a next-hop neighbor to reach the destination BFR in a Bit Index Forwarding Table (BIFT) based on the selected BFR-id (block 315). The forwarding bitmask for the destination BFR is a bitmask that indicates the destination BFRs for which the same next-hop neighbor can be used to forward a packet. In one embodiment, each bit of the forwarding bitmask represents a BFR. In one embodiment, the forwarding bitmask is a full bitstring which can accommodate all the routers in the network. As will become apparent in the descriptions provided below, the forwarding bitmask can be used to ensure that a packet is forwarded to a particular next-hop neighbor only once, even if there is more than one destination BFR that utilizes that next-hop neighbor. In one embodiment the forwarding bitmask is calculated and stored in a BIFT in a similar fashion to that described in draft-wijnands-bier-architecture-01. In one embodiment, the BIFT maintains a mapping of a BFR-id to a corresponding forwarding bitmask and a next-hop neighbor to reach the BFR associated with the BFR-id. In one embodiment, the BIFT can be established and maintained as described in draft-winjnands-bier-architecture-01. In one embodiment, the BIFT is derived from a Bit Index Routing Table (BIRT), as described in draft-wijnands-bier-architecture-01.

The BFR creates a copy of the packet (block 320).

The BFR clears the selected BFR-id from the bitstring of the packet (block 325). The selected BFR-id can be cleared from the packet because the copy of the packet includes the selected BFR-id and the copy will be used for forwarding towards the BFR corresponding to the selected BFR-id (i.e., the destination BFR).

The BFR checks, for each unprocessed BFR-id, whether a bit corresponding to that unprocessed BFR-id is set in the forwarding bitmask (block 330). In one embodiment, an unprocessed BFR-id is a BFR-id that has not been cleared from the packet (i.e., the BFR-id has a non-zero value). As mentioned above, a forwarding bitmask for the destination BFR is a bitmask that indicates the destination BFRs for which the same next-hop neighbor can be used to forward a packet. As such, if a bit corresponding to a BFR-id is set (e.g., set to 1) in the forwarding bitmask, this means that the same next-hop neighbor can be used to reach the BFR corresponding to that BFR-id. If a bit corresponding to a BFR-id is not set (e.g., set to 0), then this means that the same next-hop neighbor is not used to reach the BFR corresponding to that BFR-id.

The BFR clears, from the bitstring of the packet, each unprocessed BFR-id for which a bit corresponding to that unprocessed BFR-id is set in the forwarding bitmask (block 345). If the bit corresponding to the unprocessed BFR-id is set in the forwarding bitmask, this means that the same next-hop neighbor used to reach the destination BFR can also be used to reach the BFR corresponding to the unprocessed BFR-id. As such, the copy of the packet, which has the unprocessed BFR-id set, can be used for forwarding towards both the destination BFR and the BFR corresponding to the unprocessed BFR-id. Thus, the unprocessed BFR-id can be cleared from the original packet because the copy of the packet will handle the forwarding to this BFR.

The BFR clears, from a bitstring of the copy of the packet, each unprocessed BFR-id for which a bit corresponding to that unprocessed BFR-id is not set in the forwarding bitmask (block 350). If the bit corresponding to the unprocessed BFR-id is not set in the forwarding bitmask, this means that different next-hop neighbors are used to reach the destination BFR and the BFR corresponding to the unprocessed BFR-id. As such, the copy of the packet, which will be forwarded towards the destination BFR, cannot be used for forwarding to the BFR corresponding to the unprocessed BFR-id. Thus, the unprocessed BFR-id can be cleared from the copy of the packet.

Thus, the process described herein above can be used to forward packets that are encoded using the efficient BIER encoding that lists BFR-ids directly in the packet. The forwarding efficiency of traditional BIER is preserved as the number of neighbor lookups for a packet is capped by the number of next-hops. The process reads BFR-ids directly from the packet, without performing a bitstring to bit position conversion (as done in traditional BIER).

Pseudo-code of one embodiment of a process for forwarding packets that utilize efficient BIER encoding is provided herein below. The pseudo-code provided below assumes that the encoding described with relation to FIG. 1 is used, where a 256-bit bitstring includes a list of up to 16 16-bit BFR-ids. One having ordinary skill in the art will appreciate that the pseudo-code can be modified to work with other bitstring sizes and different number of BFR-ids.

```
#define MAX_LIST 16
struct Packet_s { // data structure for packet
    u_int16_t BitStringAsBFRid[MAX_LIST]; // list of BFR-ids
    // PayLoad start here
};
// test if the k'th bit in the F-BM is set, k start at 1
bool BitMaskTest (F-BM, k) {
    return (F-BM & (1<<(k-1)));
}
void ForwardBitMaskPacket (struct Packet_s *Packet) // packet forwarding
{
    for (i = 0; i < MAX_LIST; i++) { // iterate through list
        bfr_id_i = Packet->BitStringAsBFRid[i]; // get current BFR-id
        struct FullBitMask_s *F-BM = BIFT[bfr_id_i]->F-BM; // get forwarding bitmask from BIFT
        if (!F-BM) continue;
        BFR-NBR = BIFT[bfr_id]->BFR-NBR; // get neighbor
        PacketCopy = Copy(Packet); // create copy of packet
        Packet->BitStringAsBFRid[i] = 0; // Clear current BFR-id from packet
        (since the BFR-id is in the copy)
        for (j=i+1; j< MAX_LIST; j++) { // iterate through unprocessed BFR-ids
            bfr_id_j = Packet->BitStringAsBFRid[j]; // get unprocessed BFR-id
            if (BitMaskTest(F-BM, bfr_id_j)) { // bit for BFR-id_j is set
                // BFR-id_j in copy, clear in the original
                Packet->BitStringAsBFRid[j] = 0;
            } else {
                // BFR-id_j in original, clear in the copy
                PacketCopy->BitStringAsBFRid[j] = 0;
            }
        }
        PacketSend(PacketCopy, BFR-NBR); // send copy to neighbor
    }
}
```

The BFR forwards the copy of the packet to the next-hop neighbor (block 355). As a result of the bit clearing operations above in block 350, the bitstring of the copy of the packet will only list those BFRs (i.e., more specifically their BFR-ids) of the group that are to be reached using the next-hop neighbor. In one embodiment, when the next-hop neighbor receives the copy of the packet, it can perform a similar process as described herein to further disseminate the copy of the packet to the BFRs indicated in the bitstring of the copy of the packet.

At decision block 360, the BFR checks whether all BFR-ids of the bitstring of the packet have been processed. If all BFR-ids have been processed, then the process ends. Otherwise, if all BFR-ids have not been processed, the process returns to block 310 to select another BFR-id for processing and the operations of blocks 310-355 are then repeated using that selected BFR-id. In this way, further iterations of the process will create copies of the packet and forward them to any remaining unprocessed BFR-ids.

A similar algorithm can also work on a setup as described with reference to FIG. 2, with some adjustments on the size of the data structures and constants, as defined below:

```
#define MAX_LIST 32
struct Packet_s {
    u_int8_t BitStringAsBFRid[MAX_LIST];
    // PayLoad start here
};
```

Although the encoding scheme and packet forwarding process described above focuses on improving the efficiency of the BIER architecture, one having ordinary skill in the art will understand that a similar encoding scheme and packet forwarding process can be applied to different contexts without departing from the principles and spirit of the present invention.

Figure 4:
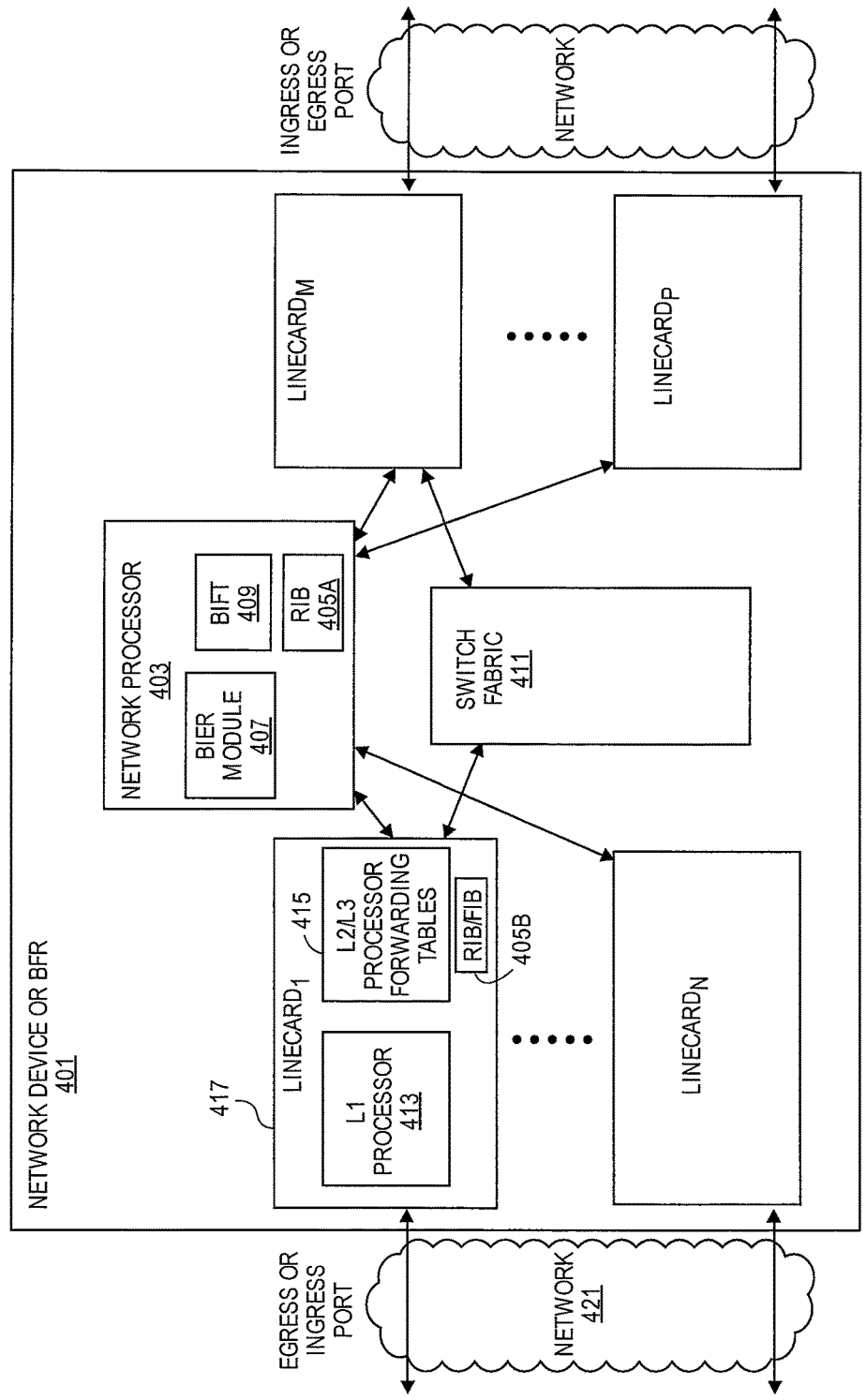
FIG. 4 is a diagram of one embodiment of a network device or router (e.g., a BFR) implementing forwarding of packets that are encoded using the efficient BIER encoding.

FIG. 4 is a diagram of one embodiment of a network device or router (e.g., a BFR) implementing forwarding of packets that are encoded using the efficient BIER encoding.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. A 'set,' as used herein, refers to any positive whole number of items. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the process is implemented by a network device or router (e.g., a BFR 401) or similar computing device. The BFR 401 can have any structure that enables it to receive data traffic and forward it toward its destination. The BFR 401 can include a network processor 403 or set of network processors that execute the functions of the BFR 401. A 'set,' as used herein, is any positive whole number of items including one item. The BFR 401 or network device can execute BIER process functionality via a network processor 403 or other components (e.g., BIER module 407) of the BFR 401.

The BIER process functions can be implemented as modules in any combination of software, including firmware, and hardware within the router. The BIER module 407 can establish and maintain a BIFT 409. The functions of the BIER process that are executed and implemented by the BFR 401 include those described further herein above.

In one embodiment, the BFR 401 can include a set of line cards 417 that process and forward the incoming data traffic toward the respective destination nodes by identifying the destination and forwarding the data traffic to the appropriate line card 417 having an egress port that leads to or toward the destination via a next hop. These line cards 417 can also implement the routing information base or forwarding information base 405B, or a relevant subset thereof. The line cards 417 can also implement or facilitate the BIER process functions described herein above. The line cards 417 are in communication with one another via a switch fabric 411 and communicate with other nodes over attached networks 421 using Ethernet, fiber optic or similar communication links and media.

In other embodiments, the processes can be implemented by a split-architecture node, where the control plane is remote from the data/forwarding plane. In this case, the BIER process can be carried out at any combination of the data plane nodes and the central controller.

The operations of the flow diagrams have been described with reference to the exemplary embodiment of the block diagrams. However, it should be understood that the operations of the flowcharts can be performed by embodiments of the invention other than those discussed, and the embodiments discussed with reference to block diagrams can perform operations different than those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the router may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

FIG. 5A illustrates connectivity between network devices (NDs) within an exemplary network, as well as three exemplary implementations of the NDs, according to some embodiments of the invention. FIG. 5A shows NDs 500A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 500A, E, and F illustrates that these NDs act as ingress and egress points for the network (and thus, these NDs are sometimes referred to as edge NDs; while the other NDs may be called core NDs).

Two of the exemplary ND implementations in FIG. 5A are: 1) a special-purpose network device 502 that uses custom application—specific integrated—circuits (ASICs) and a proprietary operating system (OS); and 2) a general purpose network device 504 that uses common off-the-shelf (COTS) processors and a standard OS.

The special-purpose network device 502 includes networking hardware 510 comprising compute resource(s) 512 (which typically include a set of one or more processors), forwarding resource(s) 514 (which typically include one or more ASICs and/or network processors), and physical network interfaces (NIs) 516 (sometimes called physical ports), as well as non-transitory machine readable storage media 518 having stored therein networking software 520. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 500A-H. During operation, the networking software 520 may be executed by the networking hardware 510 to instantiate a set of one or more networking software instance(s) 522. Each of the networking software instance(s) 522, and that part of the networking hardware 510 that executes that network software instance (be it hardware dedicated to that networking software instance and/or time slices of hardware temporally shared by that networking software instance with others of the networking software instance(s) 522), form a separate virtual network element 530A-R. Each of the virtual network element(s) (VNEs) 530A-R includes a control communication and configuration module 532A-R (sometimes referred to as a local control module or control communication module) and forwarding table(s) 534A-R, such that a given virtual network element (e.g., 530A) includes the control communication and configuration module (e.g., 532A), a set of one or more forwarding table(s) (e.g., 534A), and that portion of the networking hardware 510 that executes the virtual network element (e.g., 530A). In one embodiment, a BIER module (e.g., 533A, 533R) implements the processes described herein above as part of the networking software, which may be loaded and stored in the non-transitory machine readable media 518 or in a similar location. For example, the BIER module (e.g., 533A, 533R) may implement functionality to properly forward packets that use an explicit list encoding of multicast group membership information. Also, the BIER module (e.g., 533A, 533R) can establish and maintain a BIFT (e.g., 535A).

The special-purpose network device 502 is often physically and/or logically considered to include: 1) a ND control plane 524 (sometimes referred to as a control plane) comprising the compute resource(s) 512 that execute the control communication and configuration module(s) 532A-R; and 2) a ND forwarding plane 526 (sometimes referred to as a forwarding plane, a data plane, or a media plane) comprising the forwarding resource(s) 514 that utilize the forwarding table(s) 534A-R and the physical NIs 516. By way of example, where the ND is a router (or is implementing routing functionality), the ND control plane 524 (the compute resource(s) 512 executing the control communication and configuration module(s) 532A-R) is typically responsible for participating in controlling how data (e.g., packets) is to be routed (e.g., the next hop for the data and the outgoing physical NI for that data) and storing that routing information in the forwarding table(s) 534A-R, and the ND forwarding plane 526 is responsible for receiving that data on the physical NIs 516 and forwarding that data out the appropriate ones of the physical NIs 516 based on the forwarding table(s) 534A-R.

FIG. 5B illustrates an exemplary way to implement the special-purpose network device 502 according to some embodiments of the invention. FIG. 5B shows a special-purpose network device including cards 538 (typically hot pluggable). While in some embodiments the cards 538 are of two types (one or more that operate as the ND forwarding plane 526 (sometimes called line cards), and one or more that operate to implement the ND control plane 524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 536 (e.g., a first full mesh coupling the line cards and a second full mesh coupling all of the cards).

Returning to FIG. 5A, the general purpose network device 504 includes hardware 540 comprising a set of one or more processor(s) 542 (which are often COTS processors) and network interface controller(s) 544 (NICs; also known as network interface cards) (which include physical NIs 546), as well as non-transitory machine readable storage media 548 having stored therein software 550. Software 550 may include a BIER module 563A that implements the processes described herein above. During operation, the processor(s) 542 execute the software 550 to instantiate one or more sets of one or more applications 564A-R. While one embodiment does not implement virtualization, alternative embodiments may use different forms of virtualization—represented by a virtualization layer 554 and software containers 562A-R. For example, one such alternative embodiment implements operating system-level virtualization, in which case the virtualization layer 554 represents the kernel of an operating system (or a shim executing on a base operating system) that allows for the creation of multiple software containers 562A-R that may each be used to execute one of the sets of applications 564A-R. In this embodiment, the multiple software containers 562A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 554 represents a hypervisor (sometimes referred to as a virtual machine monitor (VMM)) or a hypervisor executing on top of a host operating system; and 2) the software containers 562A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 564A-R, as well as the virtualization layer 554 and software containers 562A-R if implemented, are collectively referred to as software instance(s) 552. Each set of applications 564A-R, corresponding software container 562A-R if implemented, and that part of the hardware 540 that executes them (be it hardware dedicated to that execution and/or time slices of hardware temporally shared by software containers 562A-R), forms a separate virtual network element(s) 560A-R. In one embodiment, the software containers 562A-R may execute the described BIER module 563A and related software described herein above. The BIER module 563A can establish and maintain a BIFT (not shown).

The virtual network element(s) 560A-R perform similar functionality to the virtual network element(s) 530A-R— e.g., similar to the control communication and configuration module(s) 532A and forwarding table(s) 534A (this virtualization of the hardware 540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 562A-R differently. For example, while embodiments of the invention are illustrated with each software container 562A-R corresponding to one VNE 560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 562A-R to VNEs also apply to embodiments where such a finer level of granularity is used.

In certain embodiments, the virtualization layer 554 includes a virtual switch that provides similar forwarding services as a physical Ethernet switch. Specifically, this virtual switch forwards traffic between software containers 562A-R and the NIC(s) 544, as well as optionally between the software containers 562A-R; in addition, this virtual switch may enforce network isolation between the VNEs 560A-R that by policy are not permitted to communicate with each other (e.g., by honoring virtual local area networks (VLANs)).

The third exemplary ND implementation in FIG. 5A is a hybrid network device 506, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 502) could provide for para-virtualization to the networking hardware present in the hybrid network device 506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 530A-R, VNEs 560A-R, and those in the hybrid network device 506) receives data on the physical NIs (e.g., 516, 546) and forwards that data out the appropriate ones of the physical NIs (e.g., 516, 546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 5C illustrates various exemplary ways in which VNEs may be coupled according to some embodiments of the invention. FIG. 5C shows VNEs 570A.1-570A.P (and optionally VNEs 570A.Q-570A.R) implemented in ND 500A and VNE 570H.1 in ND 500H. In FIG. 5C, VNEs 570A.1-P are separate from each other in the sense that they can receive packets from outside ND 500A and forward packets outside of ND 500A; VNE 570A.1 is coupled with VNE 570H.1, and thus they communicate packets between their respective NDs; VNE 570A.2-570A.3 may optionally forward packets between themselves without forwarding them outside of the ND 500A; and VNE 570A.P may optionally be the first in a chain of VNEs that includes VNE 570A.Q followed by VNE 570A.R (this is sometimes referred to as dynamic service chaining, where each of the VNEs in the series of VNEs provides a different service— e.g., one or more layer 4-7 network services). While FIG. 5C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 5A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 5A may also host one or more such servers (e.g., in the case of the general purpose network device 504, one or more of the software containers 562A-R may operate as servers; the same would be true for the hybrid network device 506; in the case of the special-purpose network device 502, one or more such servers could also be run on a virtualization layer executed by the compute resource(s) 512); in which case the servers are said to be co-located with the VNEs of that ND.

A virtual network is a logical abstraction of a physical network (such as that in FIG. 5A) that provides network services (e.g., L2 and/or L3 services). A virtual network can be implemented as an overlay network (sometimes referred to as a network virtualization overlay) that provides network services (e.g., layer2(L2, data link layer) and/or layer3 (L3, network layer) services) over an underlay network (e.g., an L3 network, such as an Internet Protocol (IP) network that uses tunnels (e.g., generic routing encapsulation (GRE), layer2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 5D illustrates a network with a single network element on each of the NDs of FIG. 5A, and within this straight forward approach contrasts a traditional distributed approach (commonly used by traditional routers) with a centralized approach for maintaining reachability and forwarding information (also called network control), according to some embodiments of the invention. Specifically, FIG. 5D illustrates network elements (NEs) 570A-H with the same connectivity as the NDs 500A-H of FIG. 5A.

FIG. 5D illustrates that the distributed approach 572 distributes responsibility for generating the reachability and forwarding information across the NEs 570A-H; in other words, the process of neighbor discovery and topology discovery is distributed.

For example, where the special-purpose network device 502 is used, the control communication and configuration module(s) 532A-R of the ND control plane 524 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 570A-H (e.g., the compute resource(s) 512 executing the control communication and configuration module(s) 532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 524. The ND control plane 524 programs the ND forwarding plane 526 with information (e.g., adjacency and route information) based on the routing structure(s). For example, the ND control plane 524 programs the adjacency and route information into one or more forwarding table(s) 534A-R (e.g., Forwarding Information Base (FIB), Label Forwarding Information Base (LFIB), and one or more adjacency structures) on the ND forwarding plane 526. For layer 2 forwarding, the ND can store one or more bridging tables that are used to forward data based on the layer 2 information in that data. While the above example uses the special-purpose network device 502, the same distributed approach 572 can be implemented on the general purpose network device 504 and the hybrid network device 506.

FIG. 5D illustrates that a centralized approach 574 (also known as software defined networking (SDN)) that decouples the system that makes decisions about where traffic is sent from the underlying systems that forwards traffic to the selected destination. The illustrated centralized approach 574 has the responsibility for the generation of reachability and forwarding information in a centralized control plane 576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 576 has a south bound interface 582 with a data plane 580 (sometime referred to the infrastructure layer, network forwarding plane, or forwarding plane (which should not be confused with a ND forwarding plane)) that includes the NEs 570A-H (sometimes referred to as switches, forwarding elements, data plane elements, or nodes). The centralized control plane 576 includes a network controller 578, which includes a centralized reachability and forwarding information module 579 that determines the reachability within the network and distributes the forwarding information to the NEs 570A-H of the data plane 580 over the south bound interface 582 (which may use the OpenFlow protocol). Thus, the network intelligence is centralized in the centralized control plane 576 executing on electronic devices that are typically separate from the NDs. In one embodiment, the centralized reachability and forwarding information module 579 may include the BIER module 581 and related software as described herein above. In one embodiment, the BIER module 581 can compute BIER memberships and distribution trees and send this information to the NEs 570A-H of the data plane 580 over the south bound interface 582. In one embodiment, such information can be encoded using the encoding scheme described here or a similar scheme.

For example, where the special-purpose network device 502 is used in the data plane 580, each of the control communication and configuration module(s) 532A-R of the ND control plane 524 typically include a control agent that provides the VNE side of the south bound interface 582. In this case, the ND control plane 524 (the compute resource(s) 512 executing the control communication and configuration module(s) 532A-R) performs its responsibility for participating in controlling how data (e.g., packets) is to be routed (e.g., the next hop for the data and the outgoing physical NI for that data) through the control agent communicating with the centralized control plane 576 to receive the forwarding information (and in some cases, the reachability information) from the centralized reachability and forwarding information module 579 (it should be understood that in some embodiments of the invention, the control communication and configuration module(s) 532A-R, in addition to communicating with the centralized control plane 576, may also play some role in determining reachability and/or calculating forwarding information—albeit less so than in the case of a distributed approach; such embodiments are generally considered to fall under the centralized approach 574, but may also be considered a hybrid approach).

While the above example uses the special-purpose network device 502, the same centralized approach 574 can be implemented with the general purpose network device 504 (e.g., each of the VNE 560A-R performs its responsibility for controlling how data (e.g., packets) is to be routed (e.g., the next hop for the data and the outgoing physical NI for that data) by communicating with the centralized control plane 576 to receive the forwarding information (and in some cases, the reachability information) from the centralized reachability and forwarding information module 579; it should be understood that in some embodiments of the invention, the VNEs 560A-R, in addition to communicating with the centralized control plane 576, may also play some role in determining reachability and/or calculating forwarding information—albeit less so than in the case of a distributed approach) and the hybrid network device 506. In fact, the use of SDN techniques can enhance the NFV techniques typically used in the general purpose network device 504 or hybrid network device 506 implementations as NFV is able to support SDN by providing an infrastructure upon which the SDN software can be run, and NFV and SDN both aim to make use of commodity server hardware and physical switches.

FIG. 5D also shows that the centralized control plane 576 has a north bound interface 584 to an application layer 586, in which resides application(s) 588. The centralized control plane 576 has the ability to form virtual networks 592 (sometimes referred to as a logical forwarding plane, network services, or overlay networks (with the NEs 570A-H of the data plane 580 being the underlay network)) for the application(s) 588. Thus, the centralized control plane 576 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 5D shows the distributed approach 572 separate from the centralized approach 574, the effort of network control may be distributed differently or the two combined in certain embodiments of the invention. For example: 1) embodiments may generally use the centralized approach (SDN) 574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 574, but may also be considered a hybrid approach.

While FIG. 5D illustrates the simple case where each of the NDs 500A-H implements a single NE 570A-H, it should be understood that the network control approaches described with reference to FIG. 5D also work for networks where one or more of the NDs 500A-H implement multiple VNEs (e.g., VNEs 530A-R, VNEs 560A-R, those in the hybrid network device 506). Alternatively or in addition, the network controller 578 may also emulate the implementation of multiple VNEs in a single ND. Specifically, instead of (or in addition to) implementing multiple VNEs in a single ND, the network controller 578 may present the implementation of a VNE/NE in a single ND as multiple VNEs in the virtual networks 592 (all in the same one of the virtual network(s) 592, each in different ones of the virtual network(s) 592, or some combination). For example, the network controller 578 may cause an ND to implement a single VNE (a NE) in the underlay network, and then logically divide up the resources of that NE within the centralized control plane 576 to present different VNEs in the virtual network(s) 592 (where these different VNEs in the overlay networks are sharing the resources of the single VNE/NE implementation on the ND in the underlay network).

On the other hand, FIGS. 5E and 5F respectively illustrate exemplary abstractions of NEs and VNEs that the network controller 578 may present as part of different ones of the virtual networks 592. FIG. 5E illustrates the simple case of where each of the NDs 500A-H implements a single NE 570A-H (see FIG. 5D), but the centralized control plane 576 has abstracted multiple of the NEs in different NDs (the NEs 570A-C and G-H) into (to represent) a single NE 5701 in one of the virtual network(s) 592 of FIG. 5D, according to some embodiments of the invention. FIG. 5E shows that in this virtual network, the NE 5701 is coupled to NE 570D and 570F, which are both still coupled to NE 570E.

FIG. 5F illustrates a case where multiple VNEs (VNE 570A.1 and VNE 570H.1) are implemented on different NDs (ND 500A and ND 500H) and are coupled to each other, and where the centralized control plane 576 has abstracted these multiple VNEs such that they appear as a single VNE 570T within one of the virtual networks 592 of FIG. 5D, according to some embodiments of the invention. Thus, the abstraction of a NE or VNE can span multiple NDs.

While some embodiments of the invention implement the centralized control plane 576 as a single entity (e.g., a single instance of software running on a single electronic device), alternative embodiments may spread the functionality across multiple entities for redundancy and/or scalability purposes (e.g., multiple instances of software running on different electronic devices).

Figure 6:
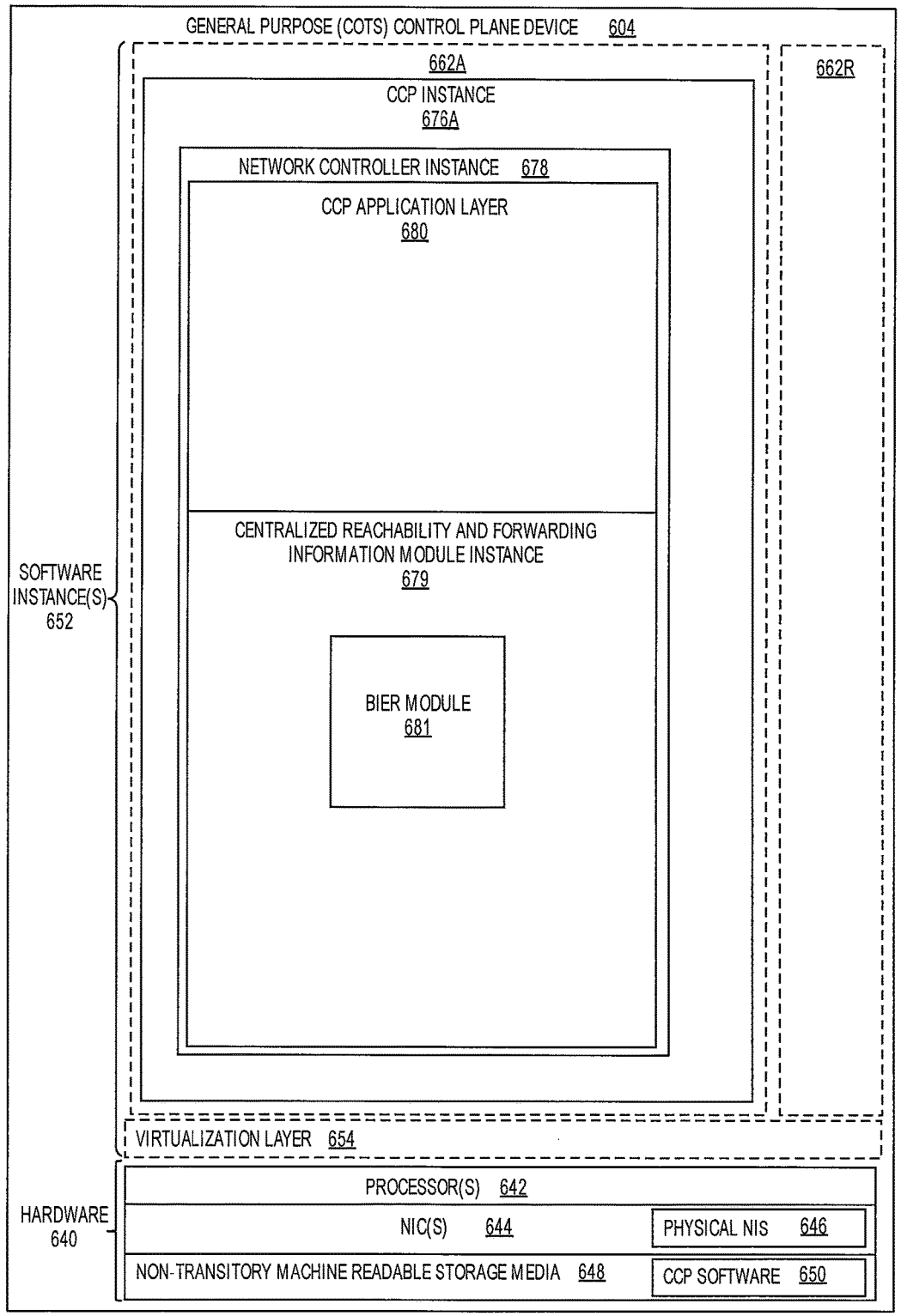
FIG. 6 illustrates a general purpose control plane device with centralized control plane (CCP) software, according to some embodiments of the invention.

Similar to the network device implementations, the electronic device(s) running the centralized control plane 576, and thus the network controller 578 including the centralized reachability and forwarding information module 579, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 6 illustrates, a general purpose control plane device 604 including hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein centralized control plane (CCP) software 650.

In embodiments that use compute virtualization, the processor(s) 642 typically execute software to instantiate a virtualization layer 654 and software container(s) 662A-R (e.g., with operating system-level virtualization, the virtualization layer 654 represents the kernel of an operating system (or a shim executing on a base operating system) that allows for the creation of multiple software containers 662A-R (representing separate user space instances and also called virtualization engines, virtual private servers, or jails) that may each be used to execute a set of one or more applications; with full virtualization, the virtualization layer 654 represents a hypervisor (sometimes referred to as a virtual machine monitor (VMM)) or a hypervisor executing on top of a host operating system, and the software containers 662A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 650 (illustrated as CCP instance 676A) is executed within the software container 662A on the virtualization layer 654. In embodiments where compute virtualization is not used, the CCP instance 676A on top of a host operating system is executed on the "bare metal" general purpose control plane device 604. The instantiation of the CCP instance 676A, as well as the virtualization layer 654 and software containers 662A-R if implemented, are collectively referred to as software instance(s) 652.

In some embodiments, the CCP instance 676A includes a network controller instance 678. The network controller instance 678 includes a centralized reachability and forwarding information module instance 679 (which is a middleware layer providing the context of the network controller 578 to the operating system and communicating with the various NEs), and an CCP application layer 680 (sometimes referred to as an application layer) over the middleware layer (providing the intelligence required for various network operations such as protocols, network situational awareness, and user-interfaces). At a more abstract level, this CCP application layer 680 within the centralized control plane 576 works with virtual network view(s) (logical view(s) of the network) and the middleware layer provides the conversion from the virtual networks to the physical view. In one embodiment, the centralized reachability and forwarding information module 679 may include the BIER module 681 and related software as described herein above. In one embodiment, the BIER module 681 can compute BIER memberships and distribution trees and send this information to the data plane 580. In one embodiment, such information can be encoded using the encoding scheme described here or a similar scheme.

The centralized control plane 576 transmits relevant messages to the data plane 580 based on CCP application layer 680 calculations and middleware layer mapping for each flow. A flow may be defined as a set of packets whose headers match a given pattern of bits; in this sense, traditional IP forwarding is also flow—based forwarding where the flows are defined by the destination IP address for example; however, in other implementations, the given pattern of bits used for a flow definition may include more fields (e.g., 10 or more) in the packet headers. Different NDs/NEs/VNEs of the data plane 580 may receive different messages, and thus different forwarding information. The data plane 580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 580, the packet (or a subset of the packet header and content) is typically forwarded to the centralized control plane 576. The centralized control plane 576 will then program forwarding table entries into the data plane 580 to accommodate packets belonging to the flow of the unknown packet. Once a specific forwarding table entry has been programmed into the data plane 580 by the centralized control plane 576, the next packet with matching credentials will match that forwarding table entry and take the set of actions associated with that matched entry.

While the invention has been described in terms of several embodiments, those skilled in the art will recognize that the invention is not limited to the embodiments described, can be practiced with modification and alteration within the spirit and scope of the descriptions provided herein. The description is thus to be regarded as illustrative instead of limiting.

The invention claimed is:

1. A method implemented by a network device to forward a packet that is encoded using an explicit list encoding of sparse multicast group membership information with Bit Index Explicit Replication (BIER), the method comprising the steps of:
receiving a packet, wherein the packet includes a bitstring that includes a list of one or more Bit Forwarding Router IDs (BFR-ids);
selecting an unprocessed BFR-id from the list of BFR-ids for processing, wherein the selected BFR-id identifies a destination Bit Forwarding Router (BFR);
looking up a forwarding bitmask for the destination BFR and a next-hop neighbor to reach the destination BFR in a bit index forwarding table (BIFT) based on the selected BFR-id;
creating a copy of the packet;
clearing the selected BFR-id from the bitstring of the packet;
checking, for each unprocessed BFR-id, whether a bit corresponding to that unprocessed BFR-id is set in the forwarding bitmask;
clearing, from the bitstring of the packet, each unprocessed BFR-id for which a bit corresponding to that unprocessed BFR-id is set in the forwarding bitmask;
clearing, from a bitstring of the copy of the packet, each unprocessed BFR-id for which a bit corresponding to that unprocessed BFR-id is not set in the forwarding bitmask; and
forwarding the copy of the packet to the next-hop neighbor.

2. The method of claim 1, wherein the list of BFR-ids includes at least two different BFR-ids that are members of different set identifier (SI) subsets.

3. The method of claim 1, wherein all of the BFR-ids in the list of BFR-ids are members of a same set identifier (SI) subset and wherein each of the BFR-ids is encoded as a SubBFR-id in the list.

4. The method of claim 1, wherein the BIFT maintains a mapping of the BFR-id of the destination BFR to a corresponding forwarding bitmask and a next-hop neighbor to reach the destination BFR.

5. The method of claim 1, wherein the forwarding bitmask is a full bitstring that accommodates all routers in a network to which the network device is connected.

6. The method of claim 1, wherein the unprocessed BFR-id is a BFR-id that has not been cleared from the packet.

7. The method of claim 1, further comprising:
checking whether all of the BFR-ids of the bitstring of the packet have been processed; and
selecting a next unprocessed BFR-id in response to determining that not all of the BFR-ids of the bitstring of the packet have been processed.

8. A network device configured to forward a packet that is encoded using an explicit list encoding of sparse multicast group membership information with Bit Index Explicit Replication (BIER), the network device comprising:
a non-transitory machine readable medium to store a BIER module; and
a network processor communicatively coupled to the non-transitory machine readable medium, the network processor configured to execute the BIER module, wherein the BIER module is configured to receive a packet that includes a bitstring that includes a list of one or more Bit Forwarding Router IDs (BFR-ids), select an unprocessed BFR-id from the list of BFR-ids for processing, wherein the selected BFR-id identifies a destination Bit Forwarding Router (BFR), look up a forwarding bitmask for the destination BFR and a next-hop neighbor to reach the destination BFR in a bit index forwarding table (BIFT) based on the selected BFR-id, create a copy of the packet, clear the selected BFR-id from the bitstring of the packet, check, for each unprocessed BFR-id, whether a bit corresponding to that unprocessed BFR-id is set in the forwarding bitmask, clear, from the bitstring of the packet, each unprocessed BFR-id for which a bit corresponding to that unprocessed BFR-id is set in the forwarding bitmask, and forward the copy of the packet to the next-hop neighbor.

9. The network device of claim 8, wherein the BIER module is further configured to check whether all of the BFR-ids of the bitstring of the packet have been processed and select a next unprocessed BFR-id in response to determining that not all of the BFR-ids of the bitstring of the packet have been processed.

10. The network device of claim 9, wherein the BIER module is further configured to end packet forwarding for the packet when all of the BFR-ids of the bitstring of the packet have been processed.

11. A non-transitory machine readable storage medium having stored therein instructions to be executed by a network device to forward a packet that is encoded using an explicit list encoding of sparse multicast group membership information with Bit Index Explicit Replication (BIER), the instructions when executed by the network device cause the network device to perform a set of operations comprising:
receiving a packet, wherein the packet includes a bitstring that includes a list of one or more Bit Forwarding Router IDs (BFR-ids);

selecting an unprocessed BFR-id from the list of BFR-ids for processing, wherein the selected BFR-id identifies a destination Bit Forwarding Router (BFR);

looking up a forwarding bitmask for the destination BFR and a next-hop neighbor to reach the destination BFR in a bit index forwarding table (BIFT) based on the selected BFR-id;

creating a copy of the packet;

clearing the selected BFR-id from the bitstring of the packet;

checking, for each unprocessed BFR-id, whether a bit corresponding to that unprocessed BFR-id is set in the forwarding bitmask;

clearing, from the bitstring of the packet, each unprocessed BFR-id for which a bit corresponding to that unprocessed BFR-id is set in the forwarding bitmask;

clearing, from a bitstring of the copy of the packet, each unprocessed BFR-id for which a bit corresponding to that unprocessed BFR-id is not set in the forwarding bitmask; and forwarding the copy of the packet to the next-hop neighbor.

12. The non-transitory machine readable storage medium of claim 11, wherein the list of BFR-ids includes at least two different BFR-ids that are members of different set identifier (SI) subsets.

13. The non-transitory machine readable storage medium of claim 11, wherein all of the BFR-ids in the list of BFR-ids are members of a same set identifier (SI) subset and wherein each of the BFR-ids is encoded as a SubBFR-id in the list.

14. The non-transitory machine readable storage medium of claim 11, wherein the BIFT maintains a mapping of the BFR-id of the destination BFR to a corresponding forwarding bitmask and a next-hop neighbor to reach the destination BFR.

15. The non-transitory machine readable storage medium of claim 11, wherein the forwarding bitmask is a full bitstring that accommodates all routers in a network to which the network device is connected.

16. The non-transitory machine readable storage medium of claim 11, wherein the unprocessed BFR-id is a BFR-id that has not been cleared from the packet.

17. The non-transitory machine readable storage medium of claim 11, wherein the instructions when executed by the network device cause the network device to perform a further set of operations comprising:

checking whether all of the BFR-ids of the bitstring of the packet have been processed; and selecting a next unprocessed BFR-id in response to determining that not all of the BFR-ids of the bitstring of the packet have been processed.

18. A computing device implementing a plurality of virtual machines for implementing network function virtualization (NFV), wherein a virtual machine from the plurality of virtual machines is configured to forward a packet that is encoded using an explicit list encoding of sparse multicast group membership information with Bit Index Explicit Replication (BIER), the computing device comprising:

a storage medium to store a BIER module; and a processor communicatively coupled to the storage medium, the processor configured to execute the virtual machine, where the virtual machine is configured to implement the BIER module, the BIER module configured to receive a packet that includes a bitstring that includes a list of one or more Bit Forwarding Router IDs (BFR-ids), select an unprocessed BFR-id from the list of BFR-ids for processing, wherein the selected BFR-id identifies a destination Bit Forwarding Router (BFR), look up a forwarding bitmask for the destination BFR and a next-hop neighbor to reach the destination BFR in a bit index forwarding table (BIFT) based on the selected BFR-id, create a copy of the packet, clear the selected BFR-id from the bitstring of the packet, check, for each unprocessed BFR-id, whether a bit corresponding to that unprocessed BFR-id is set in the forwarding bitmask, clear, from the bitstring of the packet, each unprocessed BFR-id for which a bit corresponding to that unprocessed BFR-id is set in the forwarding bitmask, and forward the copy of the packet to the next-hop neighbor.

\* \* \* \* \*